F. P. WARREN.
Cooking Utensil.

No. 126,114.    Patented April 23, 1872.

Witnesses,
Harry Smith
Thos. M. Ilwain

Frederick P. Warren
by his Attys
Knosen and Son

126,114

UNITED STATES PATENT OFFICE.

FREDERIC PELHAM WARREN, OF EAST COURT COSHAM, GREAT BRITAIN, ASSIGNOR TO GEORGE E. WARING, JR., AND J. N. A. GRISWOLD, OF NEWPORT, RHODE ISLAND.

IMPROVEMENT IN COOKING UTENSILS.

Specification forming part of Letters Patent No. 126,114, dated April 23, 1872.

I, FREDERIC PELHAM WARREN, of East Court Cosham, in the county of Hants, Kingdom of Great Britain and Ireland, have invented an Improved Cooking Utensil, of which the following is a specification:

The object of this invention is to enable flesh and other food to be cooked not only without danger of being burned or subjected in the process to a more than sufficient heat, but also to avoid its absorption of moisture, and, by the condensation of the steam or vapor given off by the evaporation of the fluids contained in such flesh or other food, to effect the boiling or stewing thereof, without its being placed or coming into contact with water for that purpose.

Figure 1:
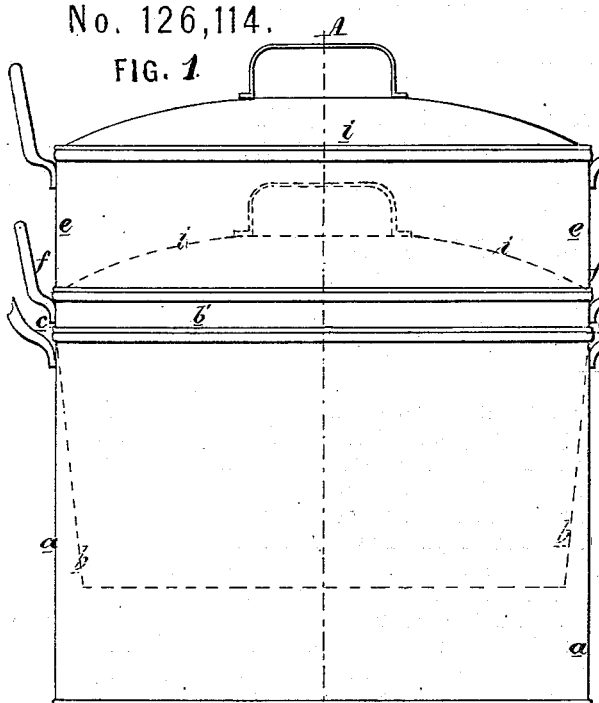
Figure 2:
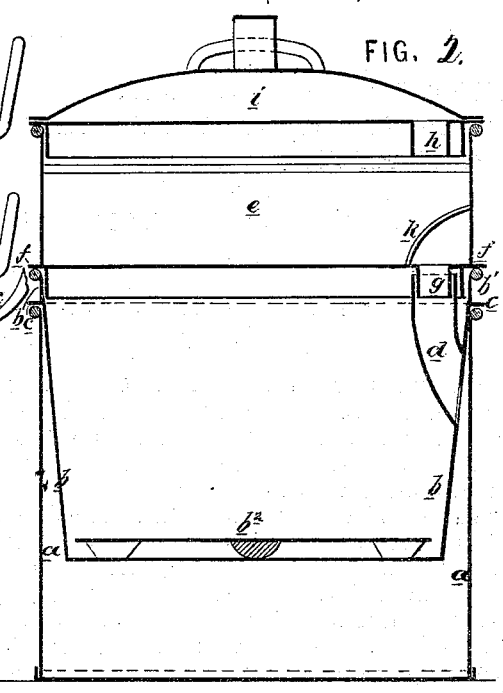
Figure 3:
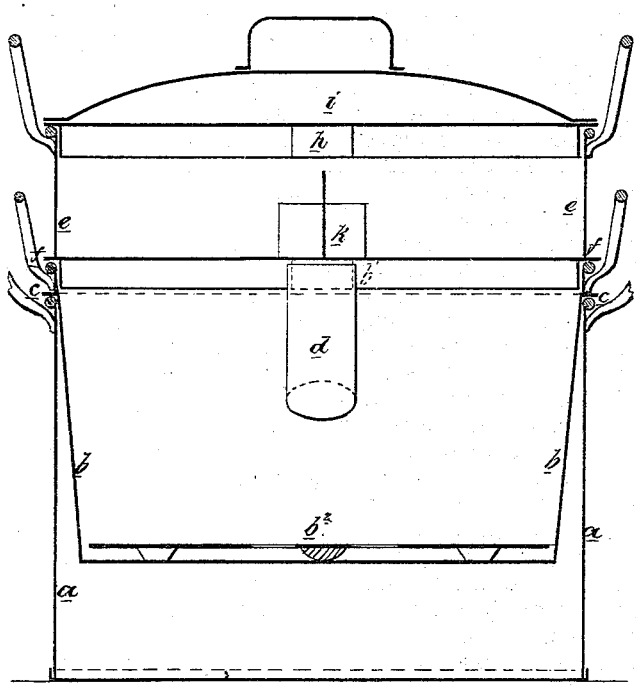
Figure 4:
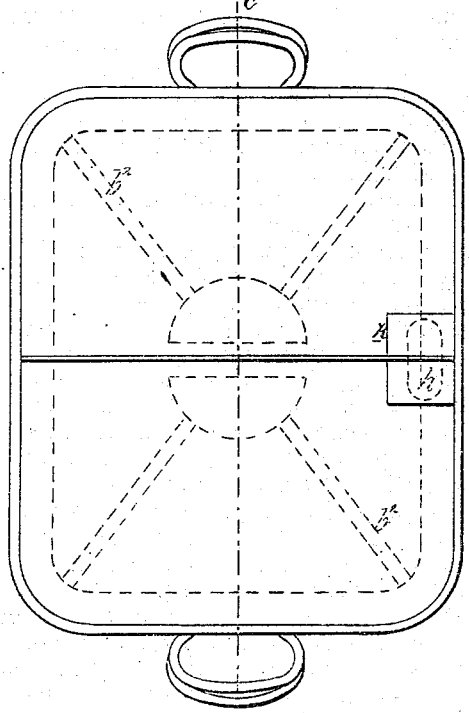

Figure 1 of the drawing is a side elevation of a cooking utensil constructed according to this invention. Fig. 2 is a sectional view of the utensil taken through the line A B of Fig. 1. Fig. 3 is a longitudinal vertical section through the line C D of Fig. 4; and Fig. 4 is a plan of the utensil.

Similar letters of reference denote the same parts in all the figures.

$a$ represents an ordinary pan or vessel containing the lower portion of a second vessel, $b$, resting by means of a rim or projection, $c$. The upper portion $b^1$ of the vessel $b$ projects above the top of the pan $a$, and is furnished with a tube or passage, $d$, communicating at its lower end with the interior of the pan $a$, and extending upward some distance within the vessel $b$. The upper part of the vessel $b$ receives and is closed by the bottom of a third vessel, $e$, which has a rim or projection, $f$, resting upon the upper part of the vessel $b$, and is also provided with a tube or pipe, $g$, fitting into and communicating with the tube or passage $d$. The flesh or animal food to be cooked is placed upon the removable false bottom $b^2$ within the inner vessel $b$, the lower portion of which latter is surrounded by the water in the pan $a$, which may be subjected to heat in the ordinary manner. The steam or vapor ascending from the flesh or animal food in the inner vessel $b$ is condensed by coming in contact with the internal surface of the less-heated upper portion $b^1$ of that vessel. The potatoes or other vegetables to be cooked or steamed are placed in the upper vessel $e$. The steam from the pan $a$ passes upward through the tubes or passages $d$ and $g$ into the vessel $e$ containing the potatoes or other vegetables to be steamed, and, after coming in contact therewith, passes through the tube or passage $h$ into the hollow cover or lid $i$, wherein it is condensed, and from whence the condensed water passes, by the pipe $h$, through the vessel $e$ and passages $g$ and $d$, back into the pan $a$. A small guard-plate, $k$, provides against any obstruction to the passage $g$ by the potatoes or other vegetables in the vessel $e$. When it is required to make use only of the vessel $b$ without employing the upper vessel $e$ the latter may be removed and the cover or lid $i$ be placed directly upon the vessel $b$, as shown dotted in Fig. 1, with its tube or passage $h$ in the tube or passage $d$ of the vessel $b$, so that the steam generated in the pan $a$, instead of passing through a vessel for the purpose of steaming or cooking potatoes or other vegetables, as before described, passes direct through the pipes $d$ and $h$ into the hollow lid $i$, as aforesaid. In some cases, where several utensils are simultaneously in in operation, instead of placing water within the outer vessel $a$ of each utensil, the steam generated in the pan $a$ of one of them may be made to pass along suitable pipes or spouts connected to the said steam-generating vessel $a$ by joints consisting of hollow tapering nozzles fixed to the said vessel, and fitting truly within correspondingly-formed conical recesses or sockets attached to the ends of the pipes or spouts so as to admit steam into the pans $a$ of the other utensils for the purpose of heating their inner vessels $b$. In other cases the cooking may be effected by steam generated in a boiler, and passing therefrom along a pipe communicating by cocks and connections with the outer vessel $a$ of each of the utensils, which latter may be placed on a suitable stand or table. The outer vessel $a$ may be provided with several smaller vessels, $b$, arranged side by side, and carried by a suitable framing resting on the top of the vessel $a$, as will be readily understood.

My invention may likewise be advantageously employed in portable apparatus for army and other purposes, in which cases the utensils may conveniently be heated by means of steam generated in an apparatus such as that known as the "Field" boiler, or any other suitable contrivance, preferring, however, to use the boiler last herein mentioned in cases where it is of importance that the cooking apparatus should be of light weight.

Having now fully described and ascertained the nature of my said invention, and in what manner the same may be conveniently carried into effect, what I claim, and desire to have secured to me by Letters Patent, is—

1. The combination of the outer vessel $a$, the inner vessel $b$, formed with an extension or condensing surface, $b^1$, the upper vessel $e$, and the hollow cover or lid $i$, constructed, arranged, and operating together, substantially in the manner herein described and set forth, for the purposes specified.

2. In combination with the vessels $a$, $b$, and $e$, and hollow lid $i$, the use or employment of the tube or passage $d$, tube or pipe $g$, guard-plate $k$, and tube or passage $h$, for the purposes and as specified.

3. The combination in a cooking utensil of an outer vessel, $a$, for containing water or steam, and an inner vessel or vessels, $b$, formed with a projecting part or condensing surface or surfaces, $b^1$, and covered by a hollow cover or lid or lids, $i$, operating to effect the boiling or stewing of flesh and other food within the said vessel or vessels $b$ without such flesh or or other food being placed or coming into contact with water for that purpose, as herein described and set forth.

FREDERIC PELHAM WARREN.

Witnesses:
　H. E. WILLS,
　JNO. GEO. PEARSON.